US008612725B2

(12) United States Patent
Tanabe et al.

(10) Patent No.: US 8,612,725 B2
(45) Date of Patent: Dec. 17, 2013

(54) MULTI-PROCESSOR SYSTEM WITH MESH TOPOLOGY ROUTERS COMPRISING LOCAL CACHE STORING FOR EACH DATA INFORMATION INDICATING REDUNDANCY IN NEIGHBOR ROUTER CACHE FOR CACHE MANAGEMENT

(75) Inventors: Jun Tanabe, Kanagawa (JP); Hiroyuki Usui, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 626 days.

(21) Appl. No.: 12/874,495

(22) Filed: Sep. 2, 2010

(65) Prior Publication Data
US 2011/0173415 A1    Jul. 14, 2011

(30) Foreign Application Priority Data

Jan. 8, 2010  (JP) ................................ 2010-003159

(51) Int. Cl.
*G06F 15/16*    (2006.01)
(52) U.S. Cl.
USPC ............................. 712/29; 709/238; 711/133
(58) Field of Classification Search
None
See application file for complete search history.

(56) References Cited

U.S. PATENT DOCUMENTS

| 5,900,015 | A | 5/1999 | Herger et al. | |
|---|---|---|---|---|
| 6,507,854 | B1* | 1/2003 | Dunsmoir et al. | 715/201 |
| 7,333,115 | B2 | 2/2008 | Yamaguchi | |
| 7,619,545 | B2 | 11/2009 | Samuels et al. | |
| 8,392,664 | B2* | 3/2013 | Comparan et al. | 711/142 |
| 2004/0111489 | A1 | 6/2004 | Yamaguchi | |
| 2005/0120134 | A1* | 6/2005 | Hubis | 709/238 |

FOREIGN PATENT DOCUMENTS

| JP | 53-73927 A | 6/1978 |
|---|---|---|
| JP | 06-208547 | 7/1994 |
| JP | 2000-020489 | 1/2000 |
| JP | 2009-054083 | 3/2009 |
| WO | 2006056900 | 6/2006 |

OTHER PUBLICATIONS

JP Office Action issued in corresponding JP Application No. 2010-003159 on Jul. 23, 2013, along with English translation thereof.

* cited by examiner

*Primary Examiner* — Kenneth Kim
(74) *Attorney, Agent, or Firm* — White & Case LLP

(57) ABSTRACT

According to one embodiment, each of routers includes: a cache mechanism that stores data transferred to the other routers or processor elements; and a unit that reads out, when an access generated from each of the processor elements is transferred thereto, if target data of the access is stored in the cache mechanism, the data from the cache mechanism and transmits the data to the processor element as a request source.

10 Claims, 9 Drawing Sheets

MULTI-PROCESSOR SYSTEM WITH MESH TOPOLOGY ROUTERS COMPRISING LOCAL CACHE STORING FOR EACH DATA INFORMATION INDICATING REDUNDANCY IN NEIGHBOR ROUTER CACHE FOR CACHE MANAGEMENT

CROSS-REFERENCE TO RELATED APPLICATIONS

This application is based upon and claims the benefit of priority from the prior Japanese Patent Application No. 2010-3159, filed on Jan. 8, 2010; the entire contents of which are incorporated herein by reference.

FIELD

Embodiments described herein relate generally to a multi-processor system and a data transfer method.

BACKGROUND

In the past, in a multi-processor system including a plurality of processor elements and a shared cache memory, processors and the shared cache memory are connected by a network including a plurality of routers (see Japanese Patent Application Laid-Open No. 2009-54083). The shared cache memory is connected to an external memory via a bridge.

In such a multi-processor system, accesses by the processor elements reach the shared cache memory respectively through the several routers. In this case, because all the memory accesses are concentrated on the shared cache memory, usually, loads on the routers to which the shared cache memory is connected increases, which is a bottleneck for an entire network.

Japanese Patent Application Laid-Open No. 2000-20489 discloses that a cache memory is provided in a communication control device, which relays data transfer between a CPU and an external apparatus, and transfer control information written by the CPU in a descriptor of a main storage unit is read out and written in the cache memory, whereby efficiency of data transfer between the CPU and the communication control device is realized. However, even if the invention disclosed in Japanese Patent Application Laid-Open No. 2000-20489 is applied to the routers of the multi-processor system, the routers access the shared cache memory and the external memory to write data in the cache memory. Therefore, the problem of the increase in the loads on the routers connected to the shared cache memory is not solved.

DETAILED DESCRIPTION

In general, according to one embodiment, a multi-processor system includes: a plurality of processor elements; and a network that connects the processor elements. The network includes: a plurality of routers that relay an access generated from each of the processor elements and data addressed to the processor element; and an access processing unit that transmits, according to the access from the processor element, target data of the access to the processor element as a request source, and each of the routers includes: a cache mechanism that stores data transferred to the other routers or the processor elements; and a transmitter that reads out, when an access generated from the processor element is transferred thereto, if target data of the access is stored in the cache mechanism, the data from the cache mechanism and transmits the data to the processor element as the request source.

Exemplary embodiments of a multi-processor system and a data transfer method will be explained below in detail with reference to the accompanying drawings. The present invention is not limited to the following embodiments.

Figure 1:
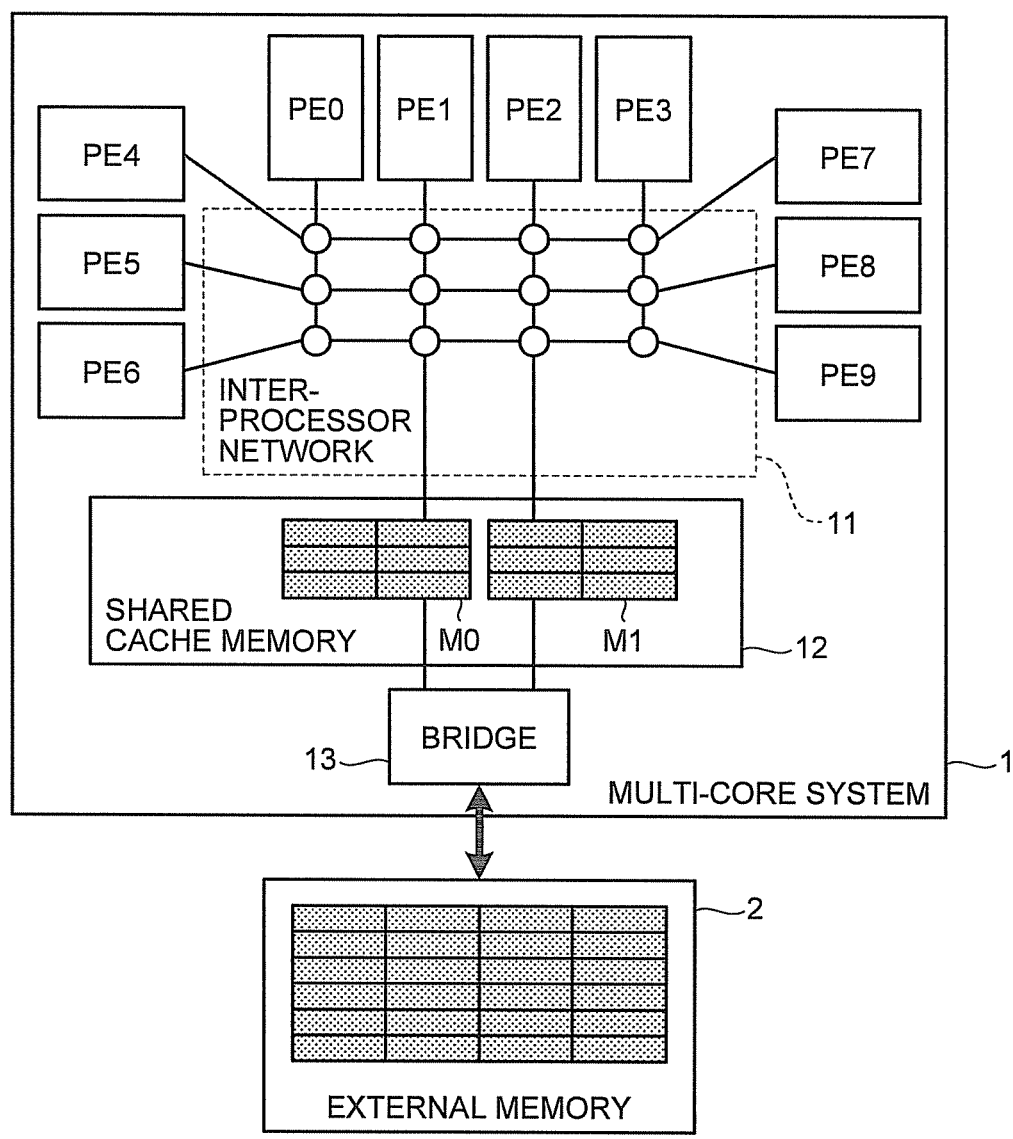
FIG. 1 is a block diagram of the configuration of a multi-processor system according to a first embodiment.

FIG. 1 is a block diagram of the configuration of a multi-processor system according to a first embodiment. The multi-processor system 1 has a configuration in which a plurality of processor elements PE0 to PE9 and a shared cache memory 12 are connected via an inter-processor network 11 including a plurality of routers. The shared cache memory 12 includes two cache memories (M0 and M1). The shared cache memory 12 is connected to an external memory 2 via a bridge 13.

Figure 2:
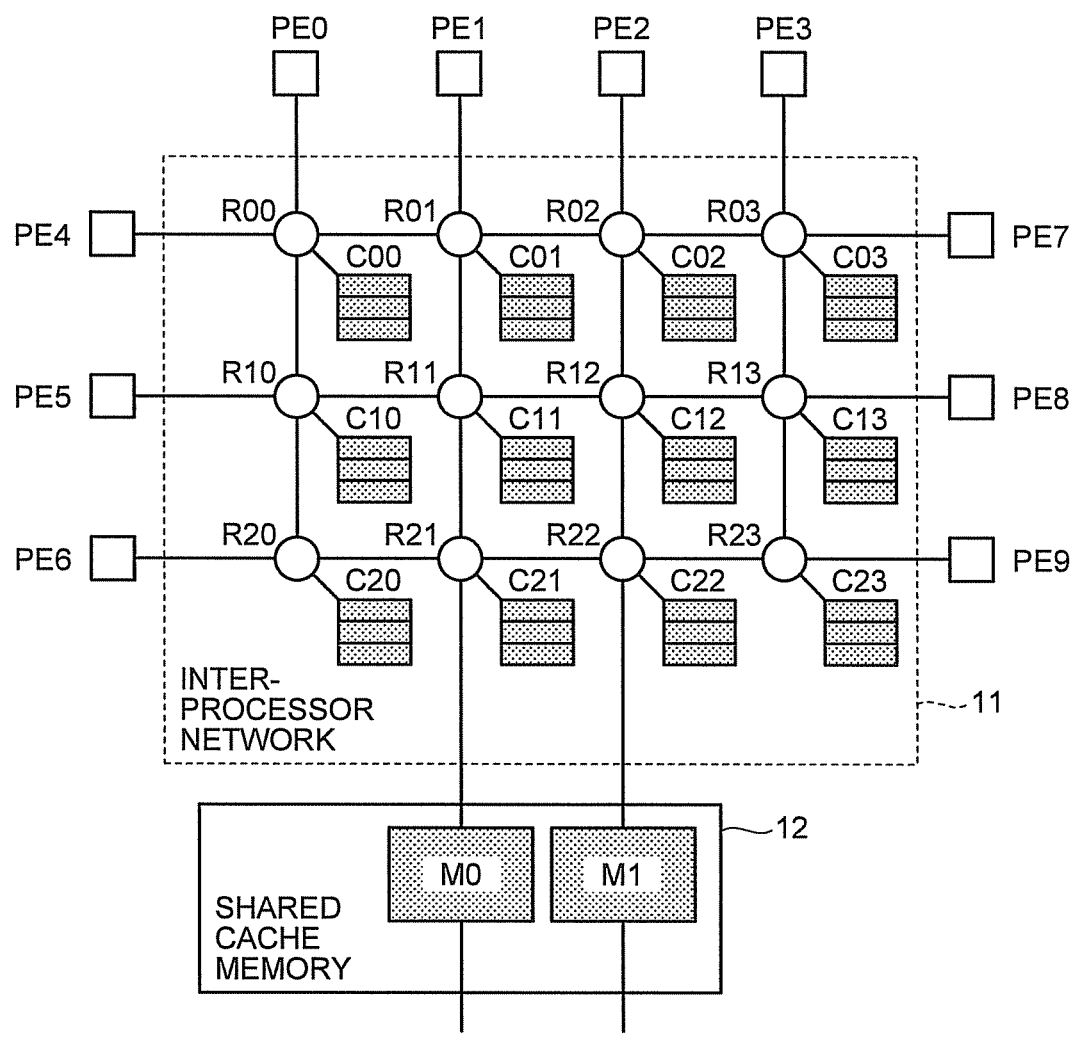
FIG. 2 is a diagram of the schematic configuration of an inter-processor network of the multi-processor system according to the first embodiment.

The schematic configuration of the inter-processor network 11 of the multi-processor system according to this embodiment is shown in FIG. 2. The inter-processor network 11 is constructed so that a mesh topology (a lattice shape) in which routers R00 to R23 are arranged on lattice points is applied to the inter-processor network 11. The routers R00 to R23 include cache mechanisms (intra-router cache mechanism C00 to C23). The intra-router cache mechanisms C00 to C23 cache read-only data accessed by the processor elements PE0 to PE9. Each of the intra-router cache mechanisms C00 to C23 can be configured by using a static random access memory (SRAM)-type memory cell and a memory controller in the same manner as the general cache memory.

Figure 3:
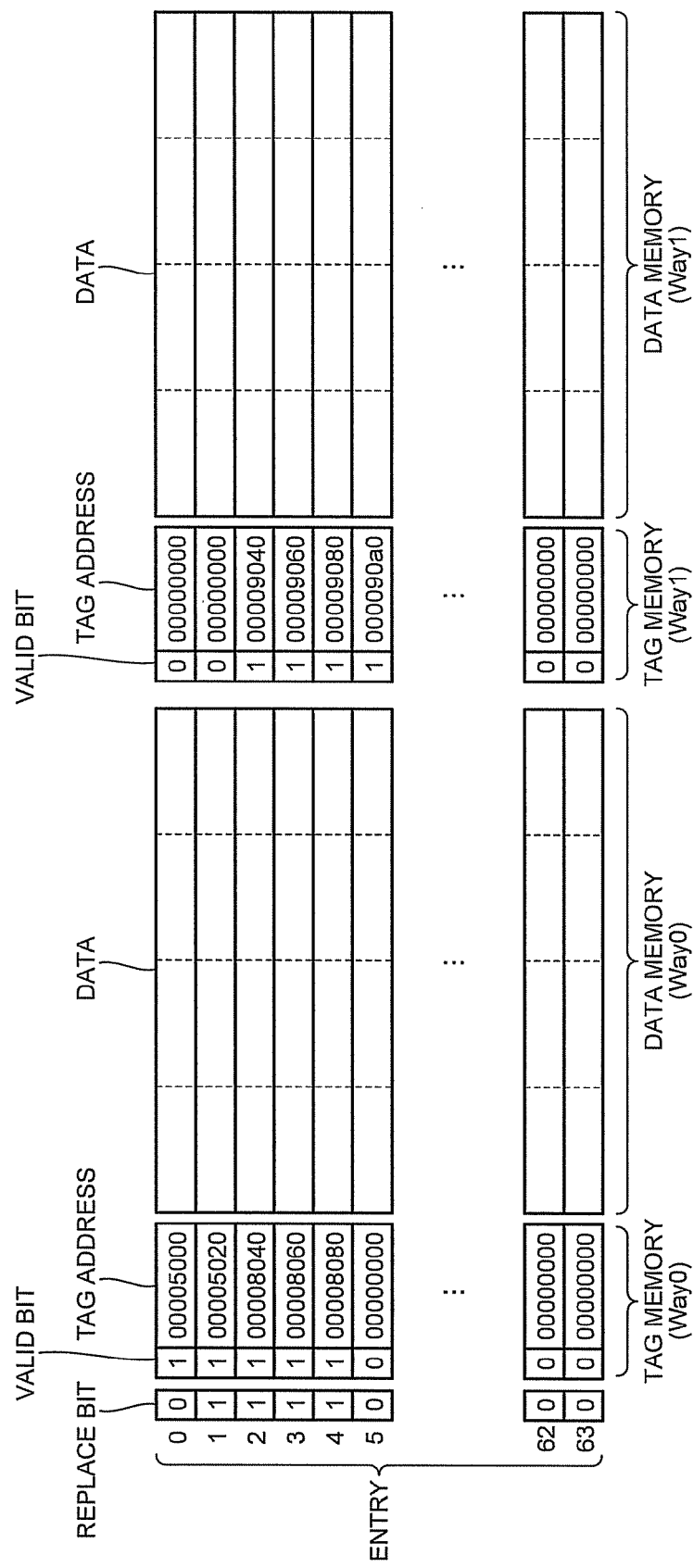
FIG. 3 is a diagram of an example of the structure of data stored in an intra-router cache mechanism.

An example of the structure of data stored in the intra-router cache mechanisms C00 to C23 is shown in FIG. 3. A two-way cache is shown as an example. However, the number of ways is not limited to a specific number. As shown in FIG. 3, the intra-router cache mechanisms C00 to C23 store data in a structure substantially the same as that in an instruction cache of the normal processor. The intra-router cache mechanisms C00 to C23 have, in common for two ways, replace bits for specifying replacement conditions of ways. The intra-router cache mechanisms C00 to C23 have, for each of ways, a valid bit, a tag address, and data.

In this embodiment, it is assumed that routing is fixed and a path for access to a certain cache memory by a certain processor element is always uniquely determined. Accesses and read data by the processor elements first move in the inter-processor network 11 shown in FIG. 2 in a lateral direction on the paper surface and thereafter moves in a longitudinal direction on the paper surface.

As a specific example, when the processor element PE0 or PE4 read-accesses the cache memory M1, the access travels through a path from PE0/PE4 to R00, R01, R02, R12, R22, and M1. Conversely, read data travels from the cache memory M1 to the processor elements PE0 or PE4 through a path from M1 to R22, R12, R02, R01, R00, and PE0/PE4.

As another example, when the processor element PE2 read-accesses the cache memory M0, the access travels through a path from PE2 to R02, R01, R11, R21, and M0. Conversely, read data travels from the cache memory M0 to the processor element PE2 through a path from M0 to R21, R11, R01, R02, and PE2.

On the other hand, all read accesses to an area not having a read-only attribute of the shared cache memory 12 reach the shared cache memory 12. Read data read out from the shared cache memory 12 (the cache memories M0 and M1) is returned to the processor elements at request sources (transmission sources of the read accesses).

The intra-router cache mechanisms C00 to C23 operate when read accesses by the processor elements PE0 to PE9 are made to an area having the read-only attribute of the shared cache memory 12. Memory Management Unit (MMU) information or the like of the processor elements is sent to the routers R00 to R23 together with read requests, whereby the routers R00 to R23 determine whether read accesses are made to the area having the read-only attribute of the shared cache memory 12.

When any one of the processor elements accesses the area having the read-only attribute of the shared cache memory 12, the access is checked by the routers through which the access passes until reaching the shared cache memory 12. When any one of the routers that relays the access caches target data of the access in the intra-router cache mechanisms C00 to C23, the router reads out the target data of the access as read data and transmits the data to the processor element as an access source. When the target data of the access is present in none of the intra-router cache mechanisms C00 to C23 of the routers through which the data passes, a read request of the processor element travels to the shared cache memory 12 (the cache memories M0 and M1). Read data is transmitted from the shared cache memory 12.

The read data transmitted from the shared cache memory 12 (or read data that hits in the intra-router cache mechanisms C00 to C23 and is transmitted from the routers R00 to R23) is cached in the intra-router cache mechanisms C00 to C23 of the routers R00 to R23 on the path on which the read data passes.

When such an operation is performed, whereby the target data of the access hits in the intra-router cache mechanisms C00 to C23, the read access does not reach the shared cache memory 12. Therefore, it is possible to relax access concentration that occurs in the routers R21 and R22 connected to the shared cache memory 12.

Figure 9:
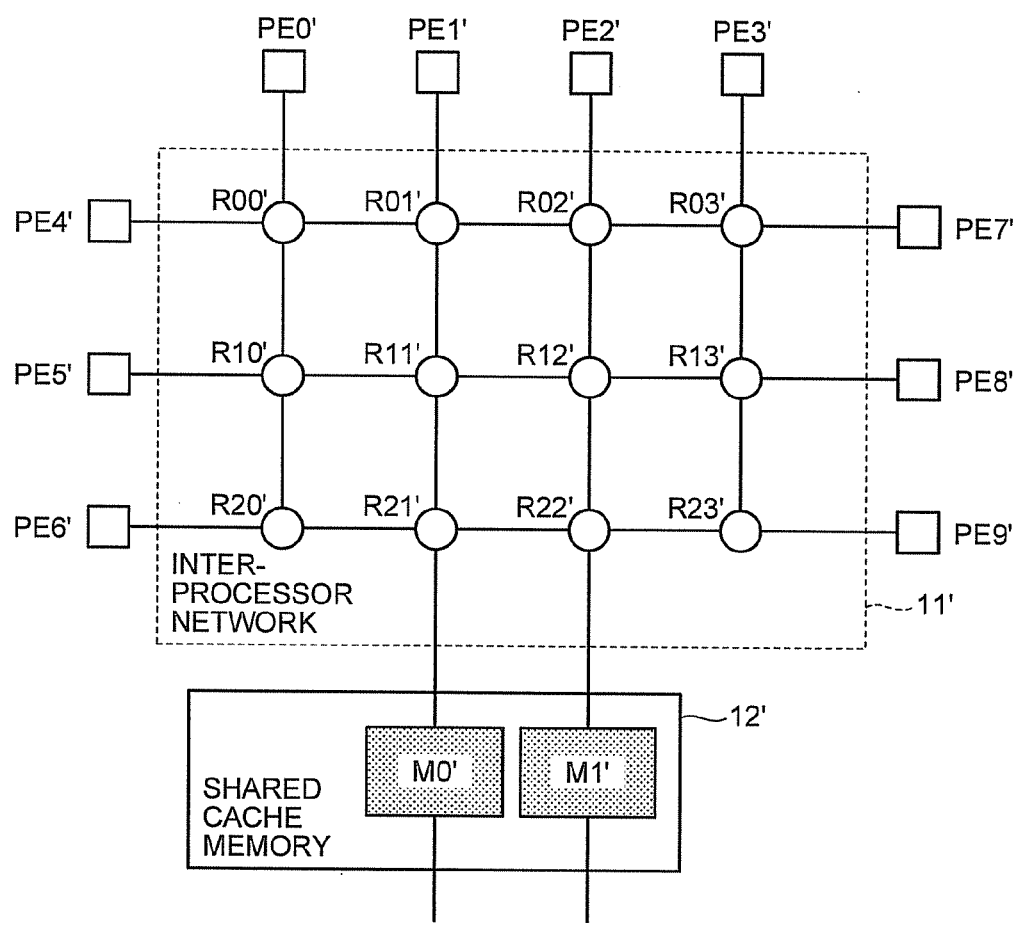
FIG. 9 is a diagram of the schematic configuration of an inter-processor network in a multi-processor system of a reference example learned by the inventor.

For comparison, the schematic configuration of an inter-processor network 11' in a multi-processor system of a reference example learned by the inventor is shown in FIG. 9. This is a configuration equivalent to that of the inter-processor network 11 shown in FIG. 1. In this network configuration, accesses from processor elements PE0' to PE9' to a shared cache memory 12' (cache memories M0' and M1') are concentrated on routers (R21' and R22') directly connected to the shared cache memory 12'. Therefore, high loads are applied to the routers R21' and R22', which are a bottleneck for an entire network.

In this embodiment, a routing policy can be changed between a read access to the area having the read-only attribute of the shared cache memory 12 and other accesses (a read access and a write access to the area not having the read-only attribute of the shared cache memory 12).

For example, when a routing policy in the lateral direction on the paper surface to the longitudinal direction on the paper surface shown in FIG. 2 is applied, the router R11 is likely to relay accesses and data concerning eight processor elements (PE0 to PE5, PE7, and PE8). The router R20 is likely to relay an access and data concerning one processor element (PE6). On the other hand, when a routing policy in the longitudinal direction on the paper surface to the lateral direction on the paper surface is applied, the router R11 is likely to relay an access and data concerning one processor element (PE1). The router 20 is likely to relay accesses and data concerning four processor elements (PE0 and PE4 to PE6). Therefore, it is possible to reduce a difference among loads applied to the routers R00 to R23 by changing a routing policy between the read access to the area having the read-only attribute and the other accesses.

In the multi-processor system 1, accesses from the processor elements PE0 to PE9 to the external memory 2 and transfer of data from the external memory 2 to the processor elements PE0 to PE9 are performed via the shared cache memory 12 and the bridge 13. Therefore, concerning the access to the external memory 2, it is possible to relax the concentration of accesses on the routers R21 and R22 directly connected to the shared cache memory 12 by caching read data in the intra-router cache mechanisms C00 to C23. The same holds true for a configuration in which the external memory 2 is connected not via the shared cache memory 12.

As explained above, in the multi-processor system according to this embodiment, because the intra-router cache mechanisms are provided in the routers, read requests of the processor elements do not always reach the shared cache memory. Data cached in the intra-router cache mechanism is data relayed to the other routers and the processor elements. The routers do not voluntarily access the shared cache memory and cache data. Therefore, because access concentration on the routers directly connected to the shared cache memory is relaxed, it is possible to eliminate the bottleneck for the entire inter-processor network.

A multi-processor system according to a second embodiment is explained below. The configuration of the entire multi-processor system and the schematic configuration of an inter-processor network are the same as those in the first embodiment. However, in the second embodiment, the structure of the intra-router cache mechanisms C00 to C23 is different from that in the first embodiment.

Figure 4:
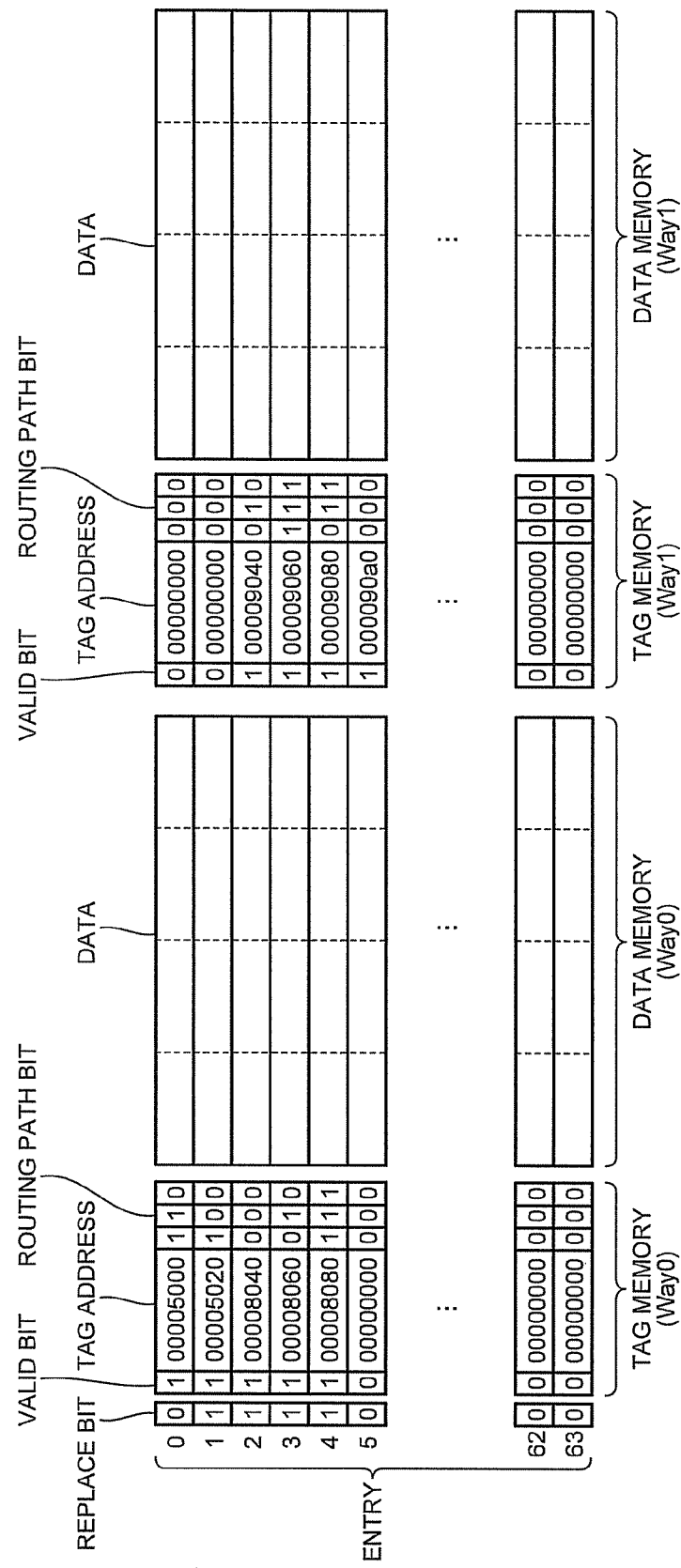
FIG. 4 is a diagram of an example of the structure of data stored in an intra-router cache mechanism in a multi-processor system according to a second embodiment.

An example of the structure of data stored in the intra-router cache mechanisms C00 to C23 is shown in FIG. 4. In this embodiment, a routing path bit is provided for each of entries of ways. The bit is provided by the number of routers (or processor elements) that are likely to transfer read data. A path to which read data of a cache entry is transferred is stored in the bit. For example, the router R11 is likely to transfer read data to the routers R01, R10, and R12. Therefore, the router R11 has three routing path bits corresponding to these routers the entries of the ways. The router R00 is likely to transfer read data to the processor elements PE0 and PE4. Therefore, the router R00 has two routing path bits corresponding to these processor elements in the entries of the ways.

An example of a change in the routing path bits is explained with reference to FIGS. 5 to 8. FIGS. 5 to 8 are diagrams of operations shown in time series. The operations are performed when, after the processor elements PE5, PE1, and PE8 access, in order, data A having the read-only attribute stored in the cache memory M0, the processor element PE1 accesses data B having the read-only attribute stored in the cache memory M0. It is assumed that the data B is data stored in an entry same as an entry of the data A in the intra-router cache mechanisms C00 to C23.

Figure 5:
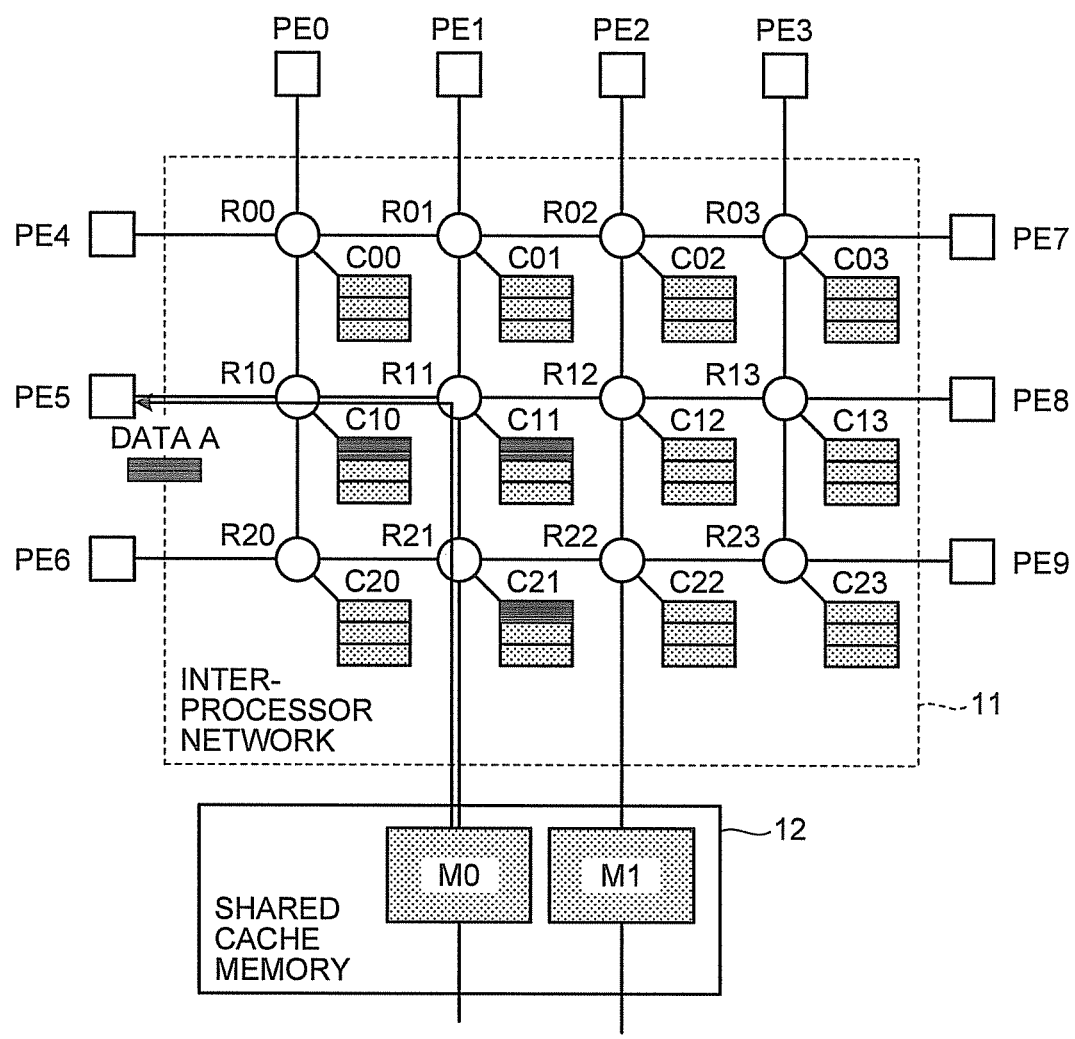
FIG. 5 is a diagram of a state in which a certain processor element accesses data having a read-only attribute stored in a shared cache memory.

A state in which the processor element PE5 accesses the data A having the read-only attribute stored in the cache memory M0 is shown in FIG. 5. When the processor element PE5 accesses the data A, a read request travels from PE5 to R10, R11, R21, and M0 and read data travels through the routers in order from M0 to R21, R11, R10, and PE5. In the routers R21, R11, and R10, the data A is stored in the intra-router cache mechanisms.

In the intra-router cache mechanism C11 of the router R11, "1" is input to a bit corresponding to the router R10 of the routing path bit of a way/entry in which the data A is stored. "0" is input to bits corresponding to the routers R01 and R12 in other paths.

Figure 6:
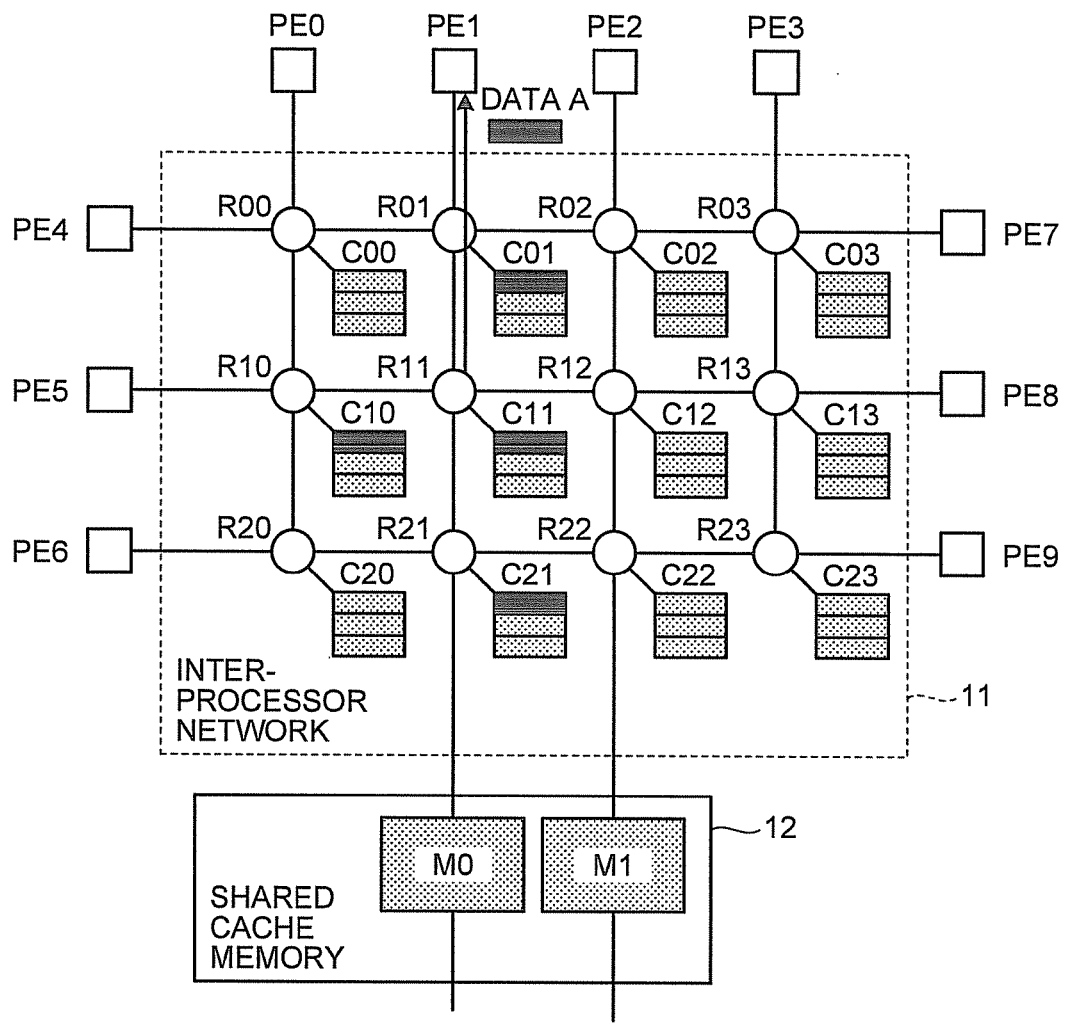
FIG. 6 is a diagram of a state in which another processor element accesses the data having the read-only attribute stored in the shared cache memory.

A state in which the processor element PE1 accesses the data A having the read-only attribute stored in the cache memory M0 is shown in FIG. 6. When the processor element PE1 accesses the data A, a read request travels from PE1 to R01 and R11 and a cache hits in the router R11. Therefore, the data A is read out from the intra-router cache mechanism C11 and read data travels through the routers in order from R11 to R0 and PE1. At this point, in the router R01, the data A is stored in the intra-router cache mechanism C01.

In the intra-router cache mechanism C11 of the router R11, a bit corresponding to the router R01 of the routing path bit of the way/entry in which the data A is stored is changed from "0" to "1".

Figure 7:
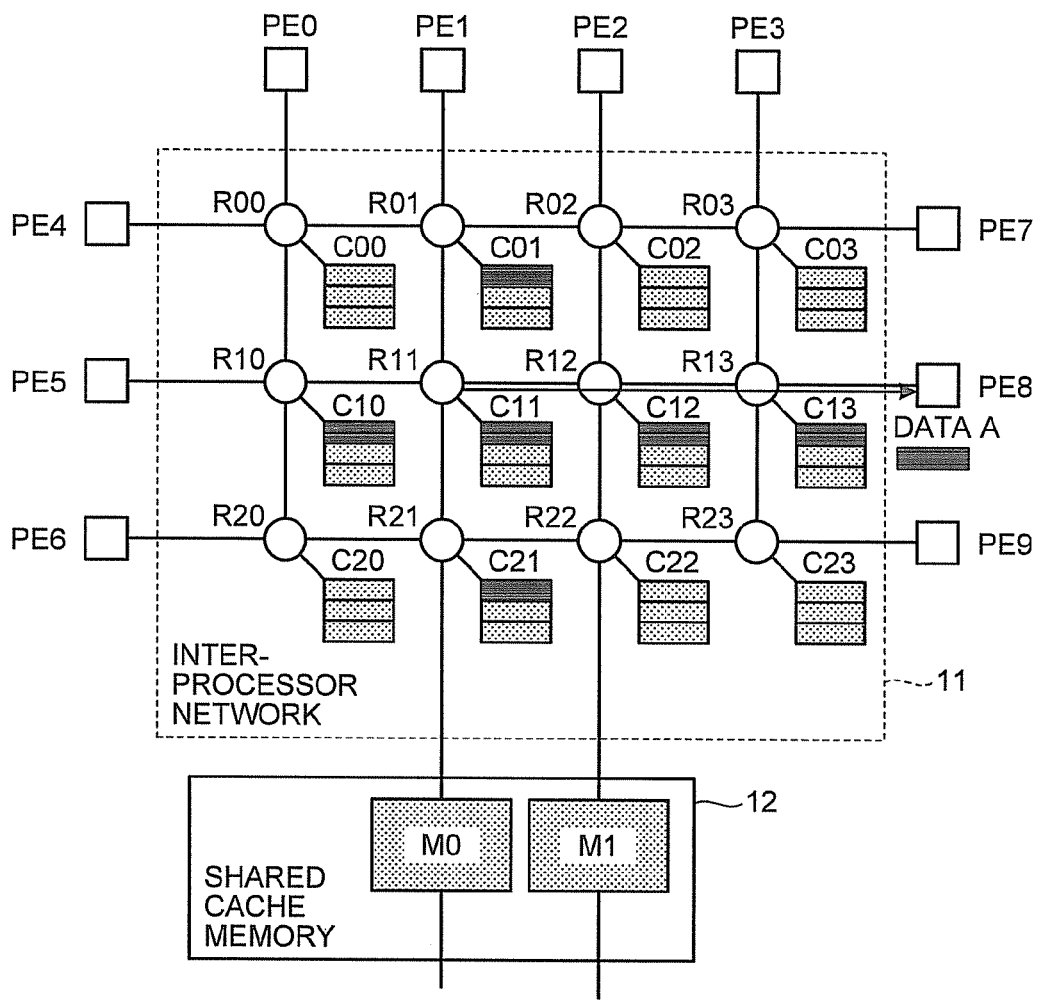
FIG. 7 is a diagram of a state in which still another processor element accesses the data having the read-only attribute stored in the shared cache memory.

A state in which the processor element PE8 accesses the data A having the read-only attribute stored in the cache memory M0 is shown in FIG. 7. When the processor element PE8 accesses the data A, a read request travels from PE8 to R13, R12, and R11 and a cache hits in the router R11. Therefore, the data A is read out from the intra-router cache mechanism C11 and read data travels through the routers in order from R11 to R12 and R13. At this point, in the routers R12 and R13, the data A is stored in the cache mechanisms C12 and C13 in the routers, respectively.

In the intra-router cache mechanism C11 of the router R11, a bit corresponding to the router R12 of the routing path bit of the way/entry in which the data A is stored is changed from "0" to "1". In the intra-router cache mechanism C11, at this timing, all the three routing path bits of the way/entry in which the data A is stored change "1", which indicates that the same data is cached in the routers (the routers R10, R01, and R12) that can be a transfer destination of data (an all path transferred state). This means that it is unnecessary to cache the data A in the intra-router cache mechanism of the router R11.

Figure 8:
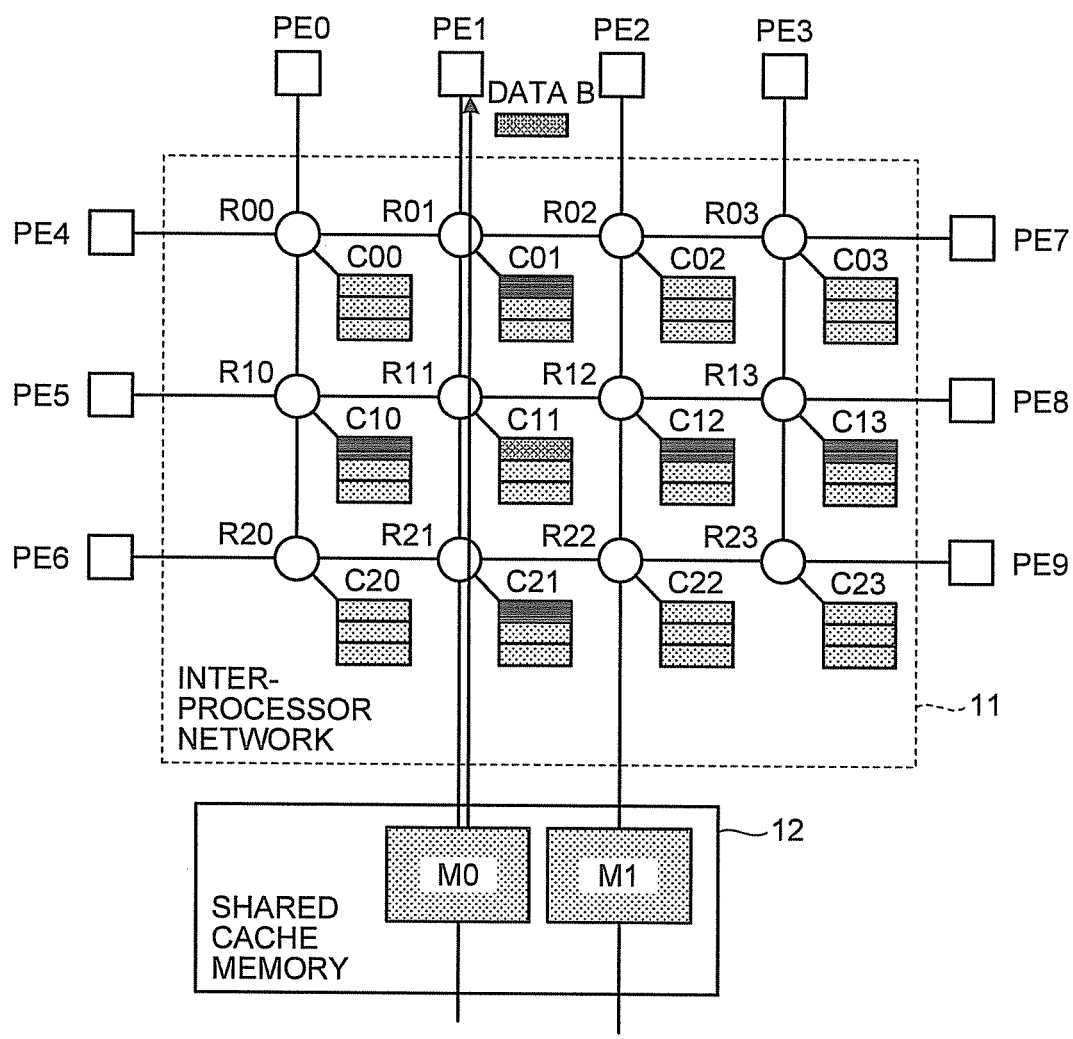
FIG. 8 is a diagram of a state in which a certain processor element accesses another data having the read-only attribute stored in the shared cache memory.

A state in which the processor element PE1 accesses the data B having the read-only attribute stored in the cache memory M0 is shown in FIG. 8. When the processor element PE1 accesses the data B, a read request travels from PE1 to R01, R11, R21, and M0. Read data travels through the routers in order from M0 to R21, R11, R01, and PE1. In the routers R21, R11, and R01, the data B is stored in the intra-router cache mechanisms C21, C11, and c01, respectively.

At this point, concerning the routers R10 and R21, not all the routing path bits of the way/entry in which the data A is stored change to "1". Therefore, when replacement of data is necessary in storing the data B, the data to be replaced is determined on a replace bit by applying a normal replace policy (least recently used (LRU), etc.) to the replacement. "1" is input to a bit corresponding to the router R11 or the processor element PE1 of a routing path bit of a way/entry in which the data B is stored. "0" is input to bits corresponding to the routers R20 and R22 or the routers R00 and R02 in other paths.

On the other hand, concerning the router R11, when the data B is stored in the intra-router cache mechanism C11, all the three routing path bits corresponding to the data A are "1". It is known that the data A is unnecessary. Therefore, as long as a valid bit of the way in which the data A is stored is not "0" (invalid), irrespectively of the normal replace policy, the data B is always stored in the way in which the data A is stored (in other words, the data A is overwritten and erased irrespectively of the normal routing policy). "1" is input to a bit corresponding to the router R01 of the routing path bit of the way/entry in which the data B is stored. "0" is input to bits corresponding to the routers R10 and R12 in other paths.

As explained above, in this embodiment, it is determined based on the routing path bit whether the same information is cached in a transfer destination of read data. Therefore, it is possible to suppress the intra-router cache mechanisms of the routers from redundantly having the same data and effectively utilize the intra-router cache mechanisms.

The operation for changing the priority of replacement of data based on the routing path bits is explained above. However, when a predetermined percentage (e.g., the majority) of the routing path bits change to "1" in an arbitrary router, it is also possible to cause, at that point, the router to operate to transfer data to a router or a processor element in which the routing path bits are "0". In this case, as in the above explanation, all the routing path bits change to "1" at a point when the transfer of the data is finished. Therefore, the transferred data can be preferentially overwritten and erased. In other words, it is possible to suppress the intra-router cache mechanisms of the routers from redundantly having the same data and effectively utilize the intra-router cache mechanisms.

The embodiments are examples of implementation of the present invention. The present invention is not limited to the embodiments.

For example, in the example explained in the embodiments, access concentration on the routers directly connected to the shared cache memory is reduced. However, it is also possible to relax concentration of accesses on routers directly connected to processor elements having high operation ratios compared with the external memory (the bridge) and the other processor elements.

The topology of the inter-processor network is not limited to the mesh type of the square lattice shape and can be other shapes (an arbitrary mesh type of a shape other than the square lattice shape, a hypercube type, etc.).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multi-processor system comprising:
a plurality of processor elements; and
a network that is constructed in a mesh topology and connects the plurality of processor elements, wherein
the network includes:
a plurality of routers arranged on lattice points of the network and relay an access generated from each of the processor elements and data addressed to the processor element; and
an access processing unit that transmits, according to the access from the processor element, target data of the access to the processor element as a request source, and
each of the routers includes:
a cache mechanism that stores data transferred to the other routers or the processor elements; and
a transmitter that reads out and transmits the data to the processor element as the request source if target data of the access is stored in the cache mechanism when an access generated from the processor element is transferred to the transmitter, wherein
the cache mechanism stores, concerning each of data being stored, routing path information indicating whether the data is transferred to each of the routers and the processor elements that can be a transfer destination, and
the router changes, based on the routing path information, an operation of the cache mechanism.

2. The multi-processor system according to claim 1, wherein, when the routing path information of any one of the data being stored in the cache mechanism changes to an all path transferred state indicating that the data is already transferred to all the routers and processor elements that can be the transfer destination, the router more preferentially rewrites an entry in which the data is stored than an entry in which data having the routing path information not in the all path transferred state is stored.

3. The multi-processor system according to claim 2, wherein
the cache mechanism has a plurality of ways, and
the router rewrites an entry of a way in which data in the all path transferred state is stored.

4. The multi-processor system according to claim 2, wherein, when the routing path information is not in the all path transferred state in all the data being stored in the cache mechanism, the router determines, according to a replace policy decided in advance, an entry to be rewritten.

5. The multi-processor system according to claim 4, wherein the replace policy is least recently used.

6. The multi-processor system according to claim 1, wherein, when any one of routing path information being stored in the cache mechanism changes to a state indicating that data is already transferred to a majority of the routers and the processor elements that can be the transfer destination, the router transfers the data to the routers and the processor elements to which the data is not transferred yet.

7. The multi-processor system according to claim 6, wherein, after the data is already transferred to the majority of the routers and the processor elements that can be the transfer destination and the data is transferred to the routers and the processor elements to which the data is not transferred yet, the router more preferentially rewrites an entry in which the data is stored than an entry in which data indicated by the routing path information as not being transferred to all the routers and processor elements that can be the transfer destination is stored.

8. A data transfer method in a multi-processor system that includes:
a plurality of processor elements;
a plurality of routers arranged on lattice points of a network constructed in a mesh topology, which connect the processor elements and relay an access generated from each of the processor elements and data addressed to the processor elements; and
a shared memory shared by the processor elements, wherein the shared memory transmits target data of the access to the processor element as a request source according to an access from the processor element,
the data transfer method comprising:
storing data transferred to the other routers or the processor elements in a cache mechanism by each of the routers; and
reading out the data from the cache mechanism and transmitting the data to the processor element as the request source if target data of the access is stored in the cache mechanism when an access generated from the processor element is transferred to each of the routers, wherein each of the routers stores, in the cache mechanism, concerning each of data being stored, routing path information indicating whether the data is transferred to each of the routers and the processor elements that can be a transfer destination, and, when the routing path information of any one of the data being stored in the cache mechanism changes to an all path transferred state indicating that the data is already transferred to all of the routers and the processor elements that can be the transfer destination, preferentially rewrites the data than data having the routing path information not in the all path transferred state.

9. A data transfer method in a multi-processor system that includes:
a plurality of processor elements;
a plurality of routers arranged on lattice points of a network constructed in a mesh topology, which connect the processor elements and relay an access generated from each of the processor elements and data addressed to the processor elements; and
a shared memory shared by the processor elements, wherein the shared memory transmits target data of the access to the processor element as a request source according to an access from the processor element,
the data transfer method comprising:
storing data transferred to the other routers or the processor elements in a cache mechanism by each of the routers; and
reading out the data from the cache mechanism and transmitting the data to the processor element as the request source if target data of the access is stored in the cache mechanism when an access generated from the processor element is transferred to each of the routers
wherein, when any one of routing path information being stored in the cache mechanism changes to a state indicating that data is already transferred to a majority of the routers and the processor elements that can be the transfer destination, the router transfers the data to the routers and the processor elements to which the data is not transferred yet.

10. The data transfer method according to claim 9, wherein, after the data is already transferred to the majority of the routers and the processor elements that can be the transfer destination and the data is transferred to the routers and the processor elements to which the data is not transferred yet, the router more preferentially rewrites an entry in which the data is stored than an entry in which data indicated by the routing path information as not being transferred to all of the routers and the processor elements that can be the transfer destination is stored.

* * * * *